United States Patent [19]

Adlerborn et al.

[11] Patent Number: 4,883,639

[45] Date of Patent: Nov. 28, 1989

[54] METHOD OF MANUFACTURING AN OBJECT OF A POWDERED MATERIAL BY ISOSTATIC PRESSING

[75] Inventors: Jan Adlerborn; Hans Larker; Jan Nilsson, all of Robertsfors, Sweden

[73] Assignee: ABB Cerama AB, Robertsfors, Sweden

[21] Appl. No.: 285,597

[22] Filed: Dec. 16, 1988

[30] Foreign Application Priority Data

Dec. 18, 1987 [SE] Sweden .................. 8705058

[51] Int. Cl.$^4$ .............................. B22F 1/00
[52] U.S. Cl. ............................ 419/49; 264/65; 419/38; 419/39
[58] Field of Search .............. 419/49, 38, 39; 264/65

[56] References Cited

U.S. PATENT DOCUMENTS 4,478,789 10/1984 Adlerborn et al. ............. 419/49
4,568,516  2/1986 Adlerborn et al. ............. 419/49
4,601,877  7/1986 Fujii et al. .................... 419/49

Primary Examiner—Stephen J. Lechert, Jr.
Attorney, Agent, or Firm—Watson, Cole, Grindle & Watson

[57] ABSTRACT

Figure 3:
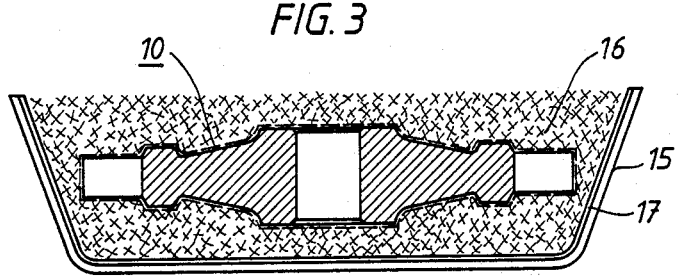

An object is manufactured of a powdered material by isostatic pressing of a body (10), preformed from the powdered material, whereby the preformed body is surrounded by a casing (16) which at least for the main part is transferred to molten phase, before the isostatic pressing is carried out while sintering the powder. As material in the casing there is used glass or a material forming glass when being heated and containing 48–52 percent by weight $B_2O_3$, 46–50 percent by weight $SiO_2$ and 1.5–2.5 percent by weight $Al_2O_3$. It can be removed from the finished object by water or water vapor and has a low coefficient of thermal expansion at temperatures below the melting temperature of the glass. To counteract the penetration of molten glass from the casing into the preformed body, a barrier layer (18) may be arranged on the preformed body inside the casing. (FIG. 3)

9 Claims, 1 Drawing Sheet

U.S. Patent  Nov. 28, 1989  4,883,639

METHOD OF MANUFACTURING AN OBJECT OF A POWDERED MATERIAL BY ISOSTATIC PRESSING

The present invention relates to a method of manufacturing an object of a powdered material by isostatic pressing of a body preformed from the powdered material.

When the preformed powder body is subjected to the isostatic pressing at the sintering temperature in order to provide a desired dense, sintered product, the body is enclosed in a casing which, during the pressing, may prevent the pressure medium used in that connection, normally a gas, from penetrating into the powder body. The casing as well as its contents are normally freed from the undesirable gases during some process stage prior to the sealing. Various ways of forming the casing are known. According to one known method, a preformed capsule of glass is used as casing. According to another known method, the casing is manufactured on the spot by dipping the preformed powder body into a suspension of particles of glass, or in some other way surrounding it with a layer of particles of such glass and then heating it under vacuum at such a temperature that the particles form a dense casing around it. Possibly, two such layers of glass having different melting points are used. According to another known method of achieving a dense casing of glass around the preformed body, the preformed body is embedded into a mass of glass particles in a heat-resistant vessel, the mass of glass particles then being rransformed into a melt, below the surface of which the preformed body is located when a pressure necessary for the isostatic pressing is applied to the melt by means of a gas.

U.S. Pat. No. 4,478,789 (Adlerborn et al) mentions a glass containing boron oxide as a suitable material for achieving a casing for a preformed body of silicon nitride since, when using such a glass, it has been found to be possible to avoid a penetration of molten glass into a preformed body of silicon nitride. As a probable explanation of the fact that a boron-containing glass does not penetrate into the silicon nitride body, there is mentioned the formation of a boron-nitrogen compound, probably boron nitride, in the boundary surface between the glass and the silicon nitride, before the glass forms a low-viscous melt, and that this boron nitrogen compound counteracts the penetration of the glass into the pores of the powder body. The content of $B_2O_3$ in the glass is stated to amount to between 2 percent by weight and 70 percent by weight.

U.S. Pat. No. 4,568,516 (Adlerborn et al) describes the use of a glass having a boron oxide content of at least 30 percent by weight, preferably at least 50 percent by weight, as casing around a preformed body during isostatic pressing, as well as removal of the casing after the pressing by means of water or water vapour such as by leaching. At least the surface layer of the preformed body then consists of a ceramic material in the form of a nitride. As examples of glass that may be used, the above-mentioned patent specification describes mixtures of $B_2O_3$ with other oxides such as alkali and earth alkali metal oxides, $SiO_2$, $GeO_2$ and $Al_2O_3$. The patent specification describes casings of boron oxide only and of a glass containing 90 percent by weight $B_2O_3$, 5 percent by weight $SiO_2$, 4 percent by weight MgO and 1 percent by weight $Al_2O_3$. The casings described in this patent specification, in comparison with silicon nitride and certain other powder materials used in the preformed body, have a high coefficient of thermal expansion at temperatures below the solidification temperature of the glass, which causes pressed and sintered parts having complicated shapes, for example with projecting thin-walled and weak portions, to become damaged by the solidified casing when being cooled down to room temperature after the isostatic pressing at the sintering temperature.

According to the present invention, it has been found to be possible to achieve a casing of a boron-containing glass, which can be removed by water or water vapour and which has a considerably lower coefficient of thermal expansion than previously used boron-containing glass. The glass has a coefficient of thermal expansion in the temperature range of 20°–200° C. ($a_{20-200°\,C.}$) of around $3.5 \cdot 10^{-6}$ °C.$^{-1}$ whereas the previously mentioned silicon nitride has a coefficient of thermal expansion of around $3.2 \cdot 10^{-6}$ °C.$^{-1}$ within the same temperature range. For water-soluble boron-containing glass hitherto used, the coefficient of thermal expansion is considerably higher than $5 \cdot 10^{-6}$ °C$^{-1}$.

According to the invention, the favourable result described is attained by using a glass or a material forming glass upon heating, which contains 48–52 percent by weight boron oxide, 46–50 percent silicon dioxide and 1.5–2.5 percent by weight aluminium oxide.

In its capacity as boron-containing glass, the glass in the casing, as will be clear from the above, does not penetrate into a preformed body in which at least the surface layer consists of a ceramic material in the form of a nitride. Also when pressing and sintering preformed bodies without a surface layer of nitride, which may form boron nitride with the glass, the glass used according to the invention possesses advantages over previously used water soluble, boron-containing glass. In such cases where the preformed body is surrounded by a barrier layer, for example by a layer of finely-divided boron nitride or of a finely-divided glass having a higher melting point than the glass in the casing, to prevent the glass from the casing from penetrating into the pores of the powder body, the penetration of the glass into the preformed body is prevented more efficiently by the use of a glass according to the present invention than by other hitherto used water soluble boron-containing glass because of the higher viscosity of the new glass under the conditions for the isostatic pressing.

The present invention is also applicable when manufacturing an object by unidirectional pressing of a preformed body embedded in the boron-containing glass in a solid mould, for instance of graphite, or steel, provided with a cavity and one or two pistons, for instance of graphite or steel acting directly on the glass. The pressing is carried out while at least the main part of the glass consists of molten phase. Also in this case the above-mentioned advantages are achieved when using a boron-containing glass according to the present invention.

More particularly, the present invention relates to a method of manufacturing an object of a powdered material by isostatic pressing of a body, preformed from the powdered material, whereby the preformed body is surrounded by a casing which consists of a boron oxide-containing glass or a boron oxidecontaining material forming glass upon heating, and which at least for the main part is transferred to molten phase, before the isostatic pressing is carried out while simultaneously sintering the powder, characterized in that the boron oxidecontaining glass or material forming glass upon heating contains 48–52 percent by weight boron oxide, 46–50 percent by weight silicon dioxide and 1.5–2.5 percent by weight aluminium oxide.

In addition to a glass of the composition stated, a mixture of the oxides included in the glass can be used as material in the casing.

If a pressure medium surrounding the casing is used during the isostatic pressing, the casing of glass is made impenetrable to the pressure medium before the isostatic pressing is carried out. The pressure medium is preferably a gas, such as argon, helium or nitrogen gas.

The removal of the glass from the manufactured object is performed while using using water or water vapour. In many cases it is suitable to remove the glass casing partially by allowing part of the glass in molten form to run off the object, whereafter the remainder, i.e. that part of the glass which is located nearest the object, is removed by water or water vapour.

The powdered material preferably consists of a ceramic material or a metallic material. As examples of ceramic materials, to which the present invention is applicable, may be mentioned nitrides such as silicon nitride, silicon aluminium oxide nitride, aluminium nitride, titanium nitride, zirconium nitride, chromium nitride, boron nitride, metal oxides such as aluminium oxide, zirconium oxide, both fully and partially stabilized, magnesium oxide, carbides such as silicon carbide, titanium carbide, boron carbide, borides such as titanium boride, zirconium boride as well as mixtures of such materials.

As examples of metallic materials may be mentioned, inter alia, steel, iron-based alloys, for example 3% Cr-Mo-steel containing 0.33% C, 0.30% Si, 0.40% Mn, 0.01% P, 0.01% S, 2.8% Cr, 0.6% Mo, the balance being Fe, or 12% Cr-Mo-V-Nb steel containing 0.18% C, 0.25% Si, 0.60% Mn, 0.01% P, 0.01% S, 11.5% Cr, 0.5% Ni, 0.5% Mo, 0.30% V, 0.25% Nb, the balance being Fe, or an alloy containing 1.27% C, 0.3% Si, 0.3% Mn, 6.4% W, 5.0% Mo, 3.1% V, 4.2% Cr, the balance being Fe, or of a nickel-based alloy, for example an alloy containing 0.03% C, 15% Cr, 17% Co, 5% Mo, 3.5% Ti, 4.4% Al, 0.03% B, the balance being Ni, or an alloy containing 0.06% C, 12% Cr, 17% Co, 3% Mo, 0.06% Zr, 4.7% Ti, 5.3% Al, 0.014% B, 1.0% V, the balance being Ni. In this paragraph and in the following text, the percentage relates to percentage by weight.

Because of the coefficient of thermal expansion of the boron glass, the present invention provides special advantages in the manufacture of objects of a powdered material having a coefficient of thermal expansion of $2.5 \cdot 10^{6}$ $C.^{-1} - 4.5 \cdot 10^{-6}$ $C.^{-1}$, preferably of $3.0 \cdot 10^{-6}$ $C.^{-1} - 4.0 \cdot 10^{-6}$ $C.^{-1}$, in the temperature range of 20°–200° C.

The boron-containing glass according to the present invention is particularly well suited for use for the manufacture of ceramic materials in the form of nitrides, such as any of the nitrides exemplified above, especially nitrides such as silicon nitride, chromium nitride, aluminium nitride, which have the ability to react with the boron oxide in the glass while forming boron nitride. The glass casing is then preferably arranged in direct contact with the preformed body. Very favourable results are obtained with silicon nitride, whose coefficient of thermal expansion lies near that of the glass, and with materials built up of silicon nitride as main constituent.

If the powered material consists of a material other than a nitride, a barrier layer of a powdered material is arranged on the preformed body inside the casing, which barrier layer counteracts the penetration of glass in molten form from the casing into the preformed body. At least an essential part of this layer may consist of boron nitride and/or a more high-melting glass than the glass in the casing. The barrier layer may also be built up, in a known manner, of several layers of boron nitride with intermediate layers of a powered material with the ability, upon contact with glass in molten form from the casing, to render a layer containing boron nitride more dense against pentrating molten glass, for example silicon carbide, silicon nitride and a glass having a higher melting point than the glass in the casing. It is also possible—in a similarly known manner—to prevent the penetration of glass by applying on the preformed body a surface layer which, at least for the most part, consists of a nitride, for example silicon nitride, chromium nitride or aluminium nitride, with the ability to form boron nitride with boron oxide. The barrier layer, or the sublayers therein when such layers exist, can be applied by immersing the preformed body into or spraying it with a suspension of the material which is to form each layer in a solvent, for example acetone, ethanol, isopropanol or another alcohol, possibly containing a binder such as butyl acrylate, followed by a drying of the preformed body.

In order that boron nitride should form on the surface of a preformed body of silicon nitride or another nitride, or in a surface layer of silicon nitride or other nitride provided on a preformed body, the preformed body with the surrounding glass casing is subjected, prior to the isostatic pressing at the sintering temperature, to a heat treatment at a temperature of at least 900° C., preferably at least 1100° C.

According to a preferred embodiment of the invention when using a pressure medium, the manufacture of the object of the powdered material is performed in such a way that the preformed body with the surrounding casing of the boron oxide-containing glass is placed in an open vessel, which is resistant to the temperature at which the sintering of the powdered material is carried out, and the casing is made impenetrable to the pressure medium, which preferably is a gas, by transforming the casing into a melt with a surface limited by the walls of the vessel, below which surface the preformed body is located when a pressure necessary for the isostatic pressing is applied to the melt by the pressure medium. To enable the formation of boron nitride on the surface of the powder body or in an intermediate layer and thereby avoid penetration of glass into the powder body, it is heated to the temperature described above before a pressure necessary for the isostatic pressing is applied on the melt. According to this embodiment, the melt can be given a suitable viscosity and a high pressure be used during the isostatic pressing with no risk of damage arising on the preformed body - a risk which is particularly great if the body has thin and weak portions.

The pressure and the temperature for the isostatic pressing and the sintering of a ceramic or metallic material are, of course, dependent on the type of this material. Normally, however, the pressure should amount to at least 100 MPa and the temperature to at least 1000° C.

The present invention is also applicable to composite products having at least some part manufactured from a powdered starting material.

Figure 1:
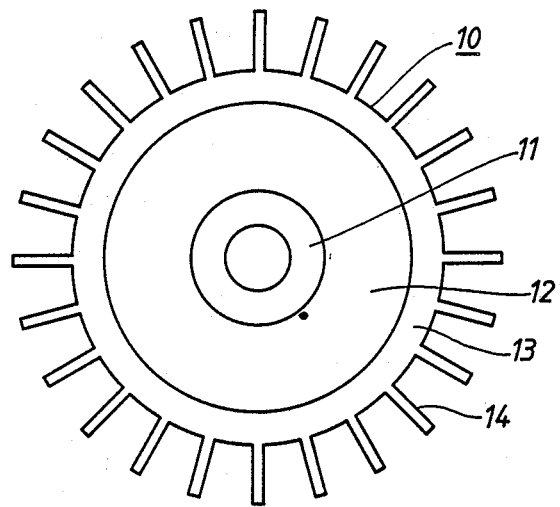
Figure 2:
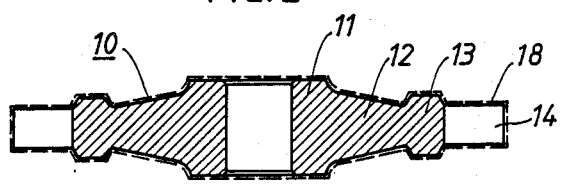

The invention will be explained in greater detail by reference to the accompanying drawing, wherein FIG. 1 shows a body, preformed from the powdered material, in the form of a turbine wheel for a gas turbine motor seen from above, FIG. 2 shows the same body in axial cross-section, and FIG. 3 shows the body placed in a temperature resistant vessel and embedded in a compound of particles of the material which is to form a casing impenetrable to the pressure medium.

EXAMPLE 1

Silicon nitride powder with a powder grain size of less than 5 $\mu$m and containing about 0.5 percent by weight free silicon and about 1 percent by weight yttrium oxide is placed in a capsule of plastic, for example plasticized polyvinyl chloride, or of rubber, having approximately the same shape as the preformed powder body to be manufactured, whereafter the capsule is sealed and subjected to a compaction at 600 MPa for a period of 5 minutes. After completed compaction the capsule is removed and the preformed body thus manuactured is machined into the desired shape. The powder body has a density of about 60% of the theoretical density.

The preformed powder body 10, which is shown in FIGS. 1 and 2, consists of a turbine wheel with hub 11, web 12, rim 13 and blades 14.

As will be clear from FIG. 3, the powder body is placed in an open-topped vessel 15, which is resistant to the sintering temperature used, and is embedded in a powder 16 of glass containing 48.8% $B_2O_3$, 48.9% $SiO_2$ and 2.3% $Al_2O_3$. In the exemplified case the vessel consists of graphite and is internally provided with a release layer 17 of boron nitride. If the bottom of the vessel is not gas-tight, a plate of gas-tight graphite, gas-tight boron nitride or molybdenum foil is applied in its bottom before the release layer 17 is applied. The casing around the preformed product is thus formed in this case by particles of the glass stated. One or more vessels 15 are placed in a high-pressure furnace of a known type which is provided with a conduit through which gas may be led for degassing the vessel with its contents, and gas, suitably argon, helium or nitrogen gas, may be supplied for generating a necessary pressure for the isostatic pressing, and which is provided with means for heating the furnace. In a high pressure furnace the preformed body 10 with the surrounding power 16 of glass is first degassed for approximately 2 hours. During continued evacuation the temperature is increased to approximately 600° C. The temperature increase is made so slowly that the pressure does not exceed 0.1 torr during any part of the time. At approximately 600° C., the temperature is held constant for approximately 1 hour during continued evacuation, whereby the final degassing takes place. After this, argon, helium or nitrogen gas is supplied so that the pressure is 0.1 MPa and the temperature is increased to 1150° C. and is maintained at this temperature for one hour, whereby the glass powder forms a melt with a relatively low viscosity which completely surrounds the powder body 10. After this treatment a surface layer of boron nitride has been formed on the preformed body. At the same temperature there is then supplied argon, helium or nitrogen gas to a pressure level which gives a pressure of 200-300 MPa at the final sintering temperature. The temperature is then raised to 1700°-1800° C., i.e. to a suitable sintering temperature for the silicon nitride for a period of one hour. The pressure then rises simultaneously. A suitable time for sintering under the conditions stated is at least two hours. After a completed cycle the furnace is allowed to cool to a suitable discharging temperature. The vessel 15 then contains a blank cake, in which the power body is visible through the solidified glass. The power body is completely embedded in the glass and has thus, during the pressing, been situated in its entirety below the surface of the melt. Due to the fact that it has been possible to apply the high pressure necessary for the pressing when the melt has been relatively low-viscous, faultless objects can be manufactured with good reproducibility. The cake is easily released from the vessel because of the presence of the release layer 17. The casing of glass can be removed by leaching by hot water, to which possibly NaOH or another alkalic compound is added, or by spraying with water vapour. The leaching by water may alternatively be carried out in an autoclave at a raised temperature. Alternatively, the casing is removed partially by heating the cake to about 1100° C., so that part of the glass runs off the finished object and leaves a film of glass thereon. This film may be removed from the object by water or water vapour, as stated above. Part of the glass may alternatively be removed during cooling of the finished object while the melt still has a sufficiently low viscosity.

EXAMPLE 2

A space, shaped like a turbine disk, in a divisible mould of aluminium silicate-based material, for example of the same type as is normally used in cores for investment casting of turbine blades, is filled with a spherical powder of an iron-based alloy containing 0.18% C., 11.5% Cr, 0.25% Si, 0.5% Mo, 0.60% Mn, 0.01% P, 0.01% S, 0.5% Ni, 0.30% V, 0.25% Nb, the balance being Fe, and with a grain size of less than 800 $\mu$m. The powder is vibrated with light blows on the mould and sintered in vacuum at 1200° C. for 2 hours. After cooling the mould, which is reusable, is divided and the porous turbine disk having essentially the same dimensions as the cavity is withdrawn. The porous turbine disk 10 is then provided with a barrier layer 18 by coating it with a fine-grained powder, the grain size being less than 1 $\mu$m, of a high melting glass consisting of 96.7 percent by weight $SiO_2$, 2.9 percent by weight $B_2O_3$ and 0.4 percent by weight $Al_2O_3$ in a layer thickness of 0.3 mm.

The turbine disk is completely embedded in a mass of glass particles of the same kind as in Example 1 in a graphite crucible, and the treatment in the high pressure furnace is carried out in the manner described in Example 1 with the difference that the isostatic pressing is carried out at a temperature of 1200° C. and a pressure of 100 MPa for 1 hour and that no interruption of the temperature increase for the formation of boron nitride need be made. By the treatment described the powder body is completely densified.

EXAMPLE 3

A turbine disk is manufactured in the manner described in Example 2 with the difference that as barrier layer 18 there is used boron nitride powder having a grain size less than 1 $\mu$m instead of the powder of a high melting glass.

EXAMPLE 4

A turbine disk is manufactured in the manner described in Example 2 with the difference that instead of a powder of a high melting glass there is used, as barrier layer, a layer built up of five sub-layers arranged one above the other, each sub-layer having a thickness of 0.2 mm. The sub-layer located nearest the preformed body consists of boron nitride, the next sub-layer consists of a mixture of equal parts by volume of boron nitride and silicon carbide, the next sub-layer consists of boron nitride, the next sub-layer consists of a mixture of equal parts by volume boron nitride and silicon carbide and the sublayer located furthest away from the preformed body consists of boron nitride. The boron nitride, like the silicon carbide, has a grain size of 0.3–2 μm.

EXAMPLE 5

The same procedure as described in Example 1 for the manufacture of a turbine wheel of silicon nitride is used in modified form for the manufacture of a turbine wheel of silicon carbide. In this case the preformed body is coated, before being placed in the vessel 15, with a surface layer 18 of silicon nitride with a grain size lower than 5 μm and with a thickness of the surface layer of around 0.2 mm. The silicon nitride layer is efficiently anchored to the preformed body and forms boron nitride at the contact surface with the boron oxide during the heat treatment to which the preformed body is subjected in the vessel 15 prior to the isostatic pressing. The boron nitride serves as barrier layer against the penetration of glass into the preformed body. The isostatic pressing is carried out at a temperature of 1900°–2000° C. Otherwise, the same conditions can be used as have been described above for silicon nitride.

EXAMPLE 6

The same procedure as described in Example 5 for the manufacture of a turbine wheel of silicon carbide is used in modified form in the manufacture of a turbine wheel of a 12% Cr-Mo-V-Nb steel containing 0.18% C, 0.25% Si, 0.60% Mn, 0.01% P, 0.01% S, 11.5% Cr, 0.5% Ni, 0.5% Mo, 0.30% V, 0.25% Nb, the balance being Fe, and with a grain size lower than 800 μm. In similar manner as has been described for the turbine wheel of silicon carbide, the preformed body is provided with a surface layer of chromium nitride. In this case, the heat treatment for the formation of boron nitride is carried out at 1000° C. for 1 hour and the isostatic pressing at a temperature of 1200° C. Otherwise, the same conditions as described above for silicon carbide can be used.

EXAMPLE 7

The same procedure as described in Example 5; for the manufacture of a turbine wheel of silicon carbide is used in modified form for the manufacture of a cutter of powder of an iron-based alloy of the following composition: 1.27% C, 0.3% Si, 0.3% Mn, 6.4% W, 5.0% Mo, 3.1% V, 4.2% Cr, the balance being Fe, and having a grain size of less than 600 μm. In the same way as has been described for the turbine wheel of silicon carbide, the preformed body is provided with a surface layer of aluminium nitride. In this case, both the heat treatment for formation of boron nitride and the isostatic pressing are carried out at 1150° C. Otherwise, the same conditions can be used as described above for silicon carbide.

EXAMPLE 8

The same procedure as described above for the manufacture of a turbine wheel of silicon nitride is used in modified form for the manufacture of an electric bushing with ceramic insulation. A cylindrical electrode of a nickel-based alloy with the composition 62% Ni, 28% Mo and 5% Fe is used as a core during cold isostatic pressing of a concentric casing of a ceramic powder. The powder consists of zirconium oxide with 4.5% yttrium oxide and has a grain size of less than 5 μm. The pressed body is formed and the ends of the electrode are freed from ceramic material by machining. In the same way as described for the turbine wheel of silicon carbide in Example 5, the composite body is provided with a surface layer of silicon nitride. In this case both the heat treatment for the formation of boron nitride and the isostatic pressing are carried out at a temperature of 1200° C. Otherwise, the same conditions can be used as described above for silicon carbide.

Instead of the glass stated in Example 1, a glass containing 50% $B_2O_3$, 48% $SiO_2$ and 2% $Al_2O_3$ can be used in the above Examples.

We claim:

1. A method of manufacturing an object of a powdered material by isostatic pressing of a body, preformed from the powdered material, whereby the preformed body is surrounded by a casing, which consists of a boron oxide-containing glass or a boron oxide-containing material which forms glass upon heating and which at least for the main part is transferred to molten phase, before the isostatic pressing is carried out while sintering the powder, wherein in that the boron oxide containing glass, or the material forming glass when heated, contains 48–52 percent by weight boron oxide, 46–50 percent by weight silicon dioxide and 1.5–2.5 percent by weight aluminium oxide.

2. A method according to claim 1, wherein the isostatic pressing is carried out with a gaseous pressure medium surrounding the casing and that the casing is made impenetrable to the pressure medium before the isostatic pressing is carried out.

3. A method according to claim 1, wherein the powdered material in the preformed body has a coefficient of thermal expansion of $2.5 \cdot 10^{-6}$ C.$^{-1}$ - $4.5 \cdot 10^{-6}$ C.$^{1}$ in the temperature range 20°–200° C.

4. A method according to claim 1, wherein the preformed body consists of a ceramic material in the form of a nitride with the ability to form boron nitride with boron oxide, and that the casing of glass is arranged in direct contact with the preformed body.

5. A method according to claim 1, wherein the preformed body consists of a silicon nitride or a material built up with silicon nitride as a main constituent.

6. A method according to claim 1, of a powdered material which counteracts the penetration of glass in molten form from the casing into the preformed body, or a material which forms such a barrier layer, is arranged on the preformed body inside the casing.

7. A method according to claim 6, wherein the barrier layer, at least for the most part, is built up of boron nitride and/or of a more high melting glass than the glass in the casing.

8. A method according to claim 6, wherein the material which forms a barrier layer at least for the most part consists of a nitride with the ability to form boron nitride with boron oxide.

9. A method according to claim 1, wherein the preformed body and the casing, when the casing is made impenetrable to the pressure medium, are placed in a vessel which is resistant to the temperature to which the sintering of the powdered material is carried out, and that the casing is transformed into a melt with a surface limited by the walls of the vessel, below which the preformed body is located when the isostatic pressing is carried out.

* * * * *